United States Patent

Chang

(10) Patent No.: US 7,047,430 B2
(45) Date of Patent: May 16, 2006

(54) METHOD FOR SAVING CHIPSET POWER CONSUMPTION

(75) Inventor: Nai-Shung Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 584 days.

(21) Appl. No.: 09/948,850

(22) Filed: Sep. 7, 2001

(65) Prior Publication Data

US 2002/0059534 A1    May 16, 2002

(30) Foreign Application Priority Data

Nov. 10, 2000    (TW) .............................. 89123791 A

(51) Int. Cl.
  *G06F 1/26*    (2006.01)
(52) U.S. Cl. ...................... 713/324; 713/320; 713/323
(58) Field of Classification Search ................ 713/324, 713/320, 323, 330, 322; 326/56, 57, 58
  See application file for complete search history.

(56) References Cited

U.S. PATENT DOCUMENTS

| | | | | |
|---|---|---|---|---|
| 5,200,653 A | * | 4/1993 | Moloney et al. ............... | 326/58 |
| 5,399,925 A | * | 3/1995 | Nguyen ........................ | 326/58 |
| 5,585,745 A | * | 12/1996 | Simmons et al. ............. | 326/93 |
| 5,630,145 A | * | 5/1997 | Chen ........................... | 713/322 |
| 5,655,124 A | * | 8/1997 | Lin .............................. | 713/322 |
| 6,065,125 A | * | 5/2000 | Shiell et al. ................. | 713/330 |
| 6,342,795 B1 | * | 1/2002 | Ohta ............................ | 327/99 |
| 6,359,639 B1 | * | 3/2002 | Kitta et al. .................. | 347/211 |
| 6,393,541 B1 | * | 5/2002 | Fujii ............................ | 711/167 |

FOREIGN PATENT DOCUMENTS

JP          59009729 A    *    1/1984

OTHER PUBLICATIONS

IBM, Chipset Low Power Mode while Maintaining DRAM Refresh, Jan. 1, 1996, IBM Technical Disclosure Bulletin, vol. 39, Issue 1, pp. 165-166.*

* cited by examiner

*Primary Examiner*—Thomas Lee
*Assistant Examiner*—Suresh K Suryawanshi
(74) *Attorney, Agent, or Firm*—J.C. Patents

(57) ABSTRACT

A method of operating a chipset for saving power consumption is provided. Basic operating units, control units and input/output ports are used to simulate the operation inside the chipset. Any idling operating units are temporarily shut down, only to be activated again on demand. Ultimately, less power consumption is used and less heat is generated by the chipset.

10 Claims, 3 Drawing Sheets

METHOD FOR SAVING CHIPSET POWER CONSUMPTION

CROSS-REFERENCE TO RELATED APPLICATION

This application claims the priority benefit of Taiwan application serial no. 89123791, filed Nov. 10, 2000.

BACKGROUND OF THE INVENTION

1. Field of Invention

The present invention relates to the internal operation of a chipset. More particularly, the present invention relates to a power-saving module of a chipset.

2. Description of Related Art

In this technologically advance society; computer products have become an indispensable part of our lives. To increase portability of these computer products, light material and miniaturized component designs are often employed. However, batteries have to be deployed if the products are to be carried around. Battery is fundamentally a device that transforms chemical power into electrical power. There is a limitation to the extent of miniaturization of a battery before output power becomes too low. In fact, a small battery actually limits the operating time of portable equipment.

SUMMARY OF THE INVENTION

Accordingly, one object of the present invention is to provide a method of operating a chipset that consumes less power. Hence, a longer operating period is possible for battery of a given size.

To achieve these and other advantages and in accordance with the purpose of the invention, as embodied and broadly described herein, the invention provides a method of operating a chipset. The chipset includes basic operating units, control units and input/output ports. Each operating unit and input/output port has a control unit. The method of operating the chipset includes the following steps. The chipset signals to the control unit of the operating unit to disable the operating unit, thereby forcing the operating unit into an power-saving mode. On the other hand, when operating unit needs to operate, the control chipset triggers corresponding control unit of the operating unit to return the operating unit into an active mode.

When the chipset activates the corresponding control unit of an operating unit to enable the particular operating unit, the enabled operating unit will temporary leave the power-saving mode. After leaving the power-saving mode, the operating unit will step into an active mode so that the operating unit can start whatever computation necessary. On completing the current computational work, the operating unit will return to the power-saving mode.

As soon as a control unit disables a corresponding operating unit, the operation unit will be completely shut down to reduce power consumption. With this arrangement, wasteful conversion of electrical power into heat when the chipset is idling for jobs can be minimized.

The invention also provides a method of operating a chipset so that power is saved. The chipset includes basic operating units, control units and input/output ports. Each operating unit and input/output port has a control unit. The method of operating the control units includes the following steps. When chipset no longer demands the operation of a particular operating unit, a signal will be sent to the control unit of the operating unit. The control unit then disables the operating unit so that the operating unit steps into an power-saving mode. On the contrary, when the chipset demands to use a particular operating unit, the chipset issues a signal to the corresponding control unit of the operating unit. The control unit then enables the required operating unit so that the operating unit returns to an active mode.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
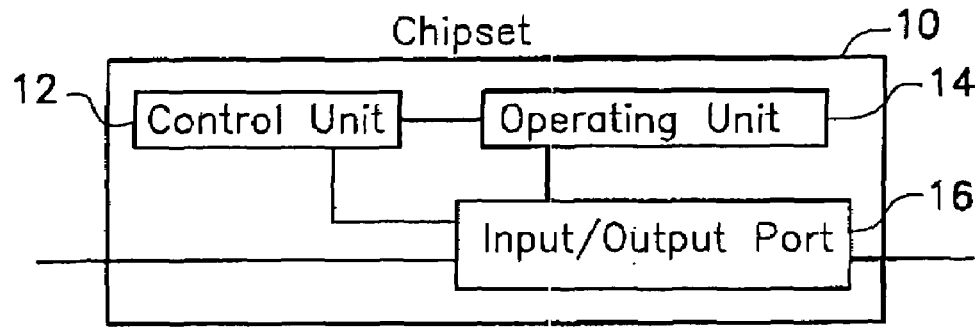
FIG. 1 is a block diagram showing the internal hardware of a chipset according to this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the internal hardware of a chipset according to this invention. As shown in FIG. 1, the chipset 10 includes a plurality of basic operating units 14, a plurality of control units 12 and a plurality of input/output ports 16. Each operating unit 14 and input/output port 16 has a control unit 12. This arrangement is different from a conventional chipset because a conventional chipset normally includes only three-state control input/output ports.

When the operating unit 14 is not required, the chipset 10 will activate the control unit 12 of the operating unit 14 so that the operating unit 14 is disabled and stepped into an power-saving mode. The operating unit 14 will be completely shut down to save power as soon as the control unit 12 issues a disable signal to the operating unit.

When the operating unit 14 is demanded by the chipset 10, the chipset 10 will signal to the control unit 12 of the operating unit 14 so that the operating unit 14 is enabled and stepped into an active mode. Enabling the operating unit 14 through the control unit 12 involves several steps described in more detail below.

Figure 2:
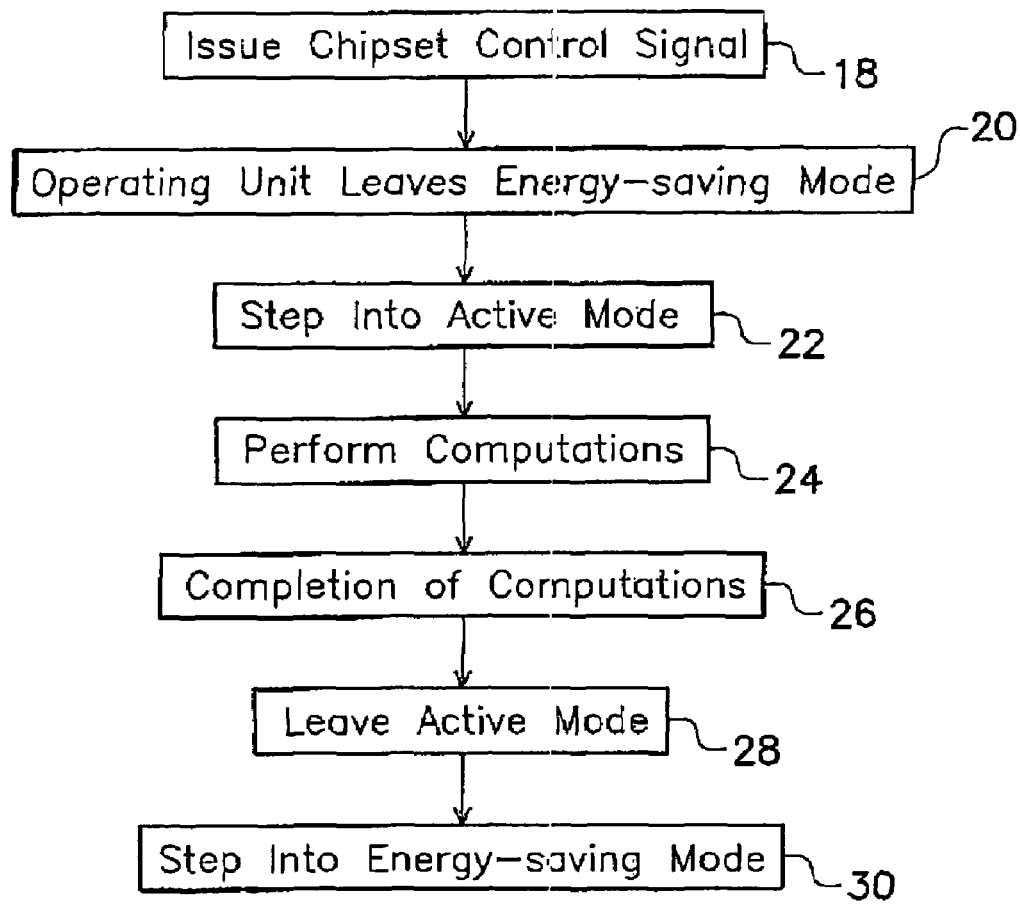
FIG. 2 is a flow chart showing the steps for operating the chipset according to this invention.

FIG. 2 is a flow chart showing the steps for operating the chipset according to this invention. As shown in FIGS. 1 and 2, the chipset 10 issues a chipset control signal 18 to the operating unit 14 asking the operating unit 14 to leave the power-saving mode 20. After leaving the power-saving mode 20, the operating unit 14 steps into an active mode 22. After getting into the active mode 22, the operating unit 14 starts to perform whatever computation 24 necessary. At the end of the computation 26, the operating unit 14 leaves the active mode 28 and returns to the power-saving mode 30.

Figure 3A:
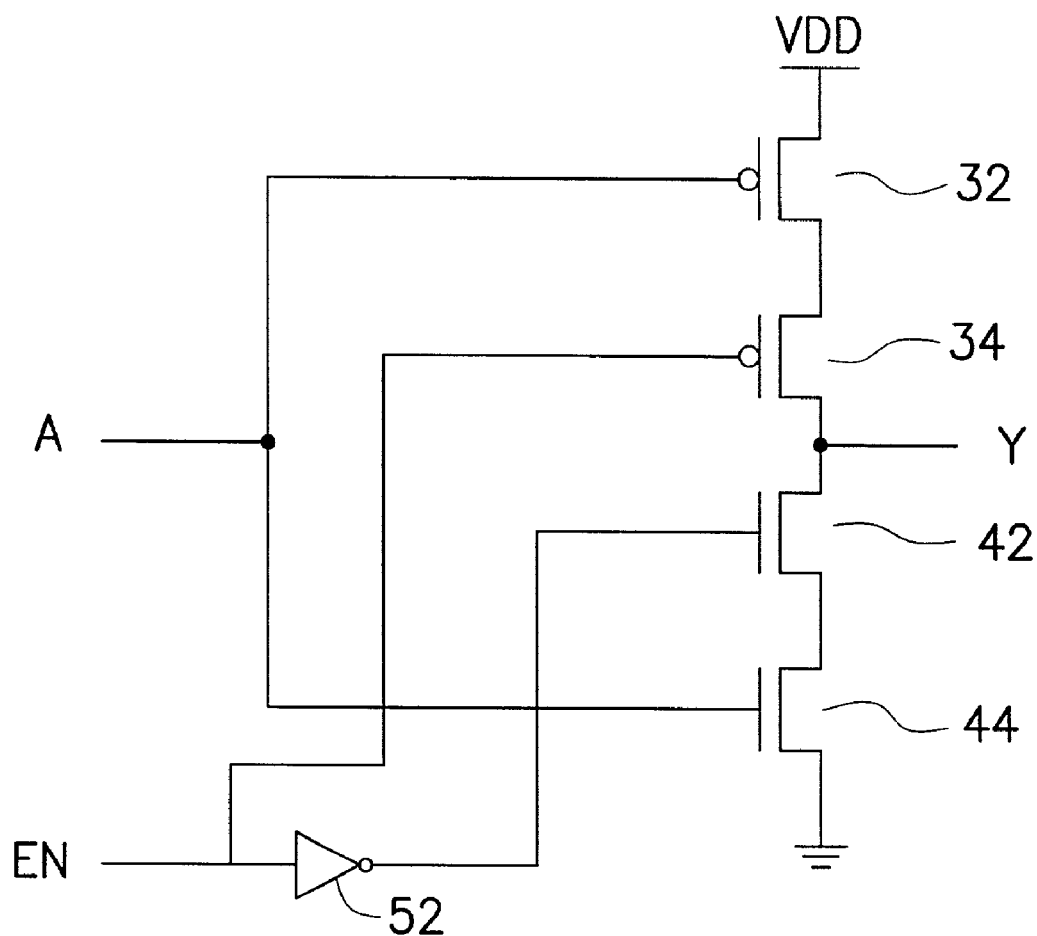
FIG. 3A is a diagram showing the internal control circuit of a chipset according to one preferred embodiment of this invention.

In the past, the basic units inside most chipset do not have tri-state control. One major aspect of this invention is that a large number of tri-state basic units are used inside the chipset. FIG. 3A is a diagram showing the internal control circuit of a chipset according to one preferred embodiment of this invention. In the embodiment of this invention, the control unit is a tri-state inverter. The tri-state inverter circuit includes P-type field effect transistors 32 and 34, N-type field effect transistors 42 and 44 and an inverter 52. An enable EN pin is the main control mechanism for enabling and disabling the tri-state inverter. The enable pin is connected to the P-type field effect transistor 34 and the N-type field effect transistor 42 after via the inverter 52. The P-type field effect transistor 34 and the N-type field effect transistor 42 are the two main enable/disable devices in this circuit. When the enable lead sets these two transistors to conductive, the tri-state inverter is completely cut off from the power source. Hence, not only is the tri-state inverter disabled, no power is consumed as well.

Figure 3B:
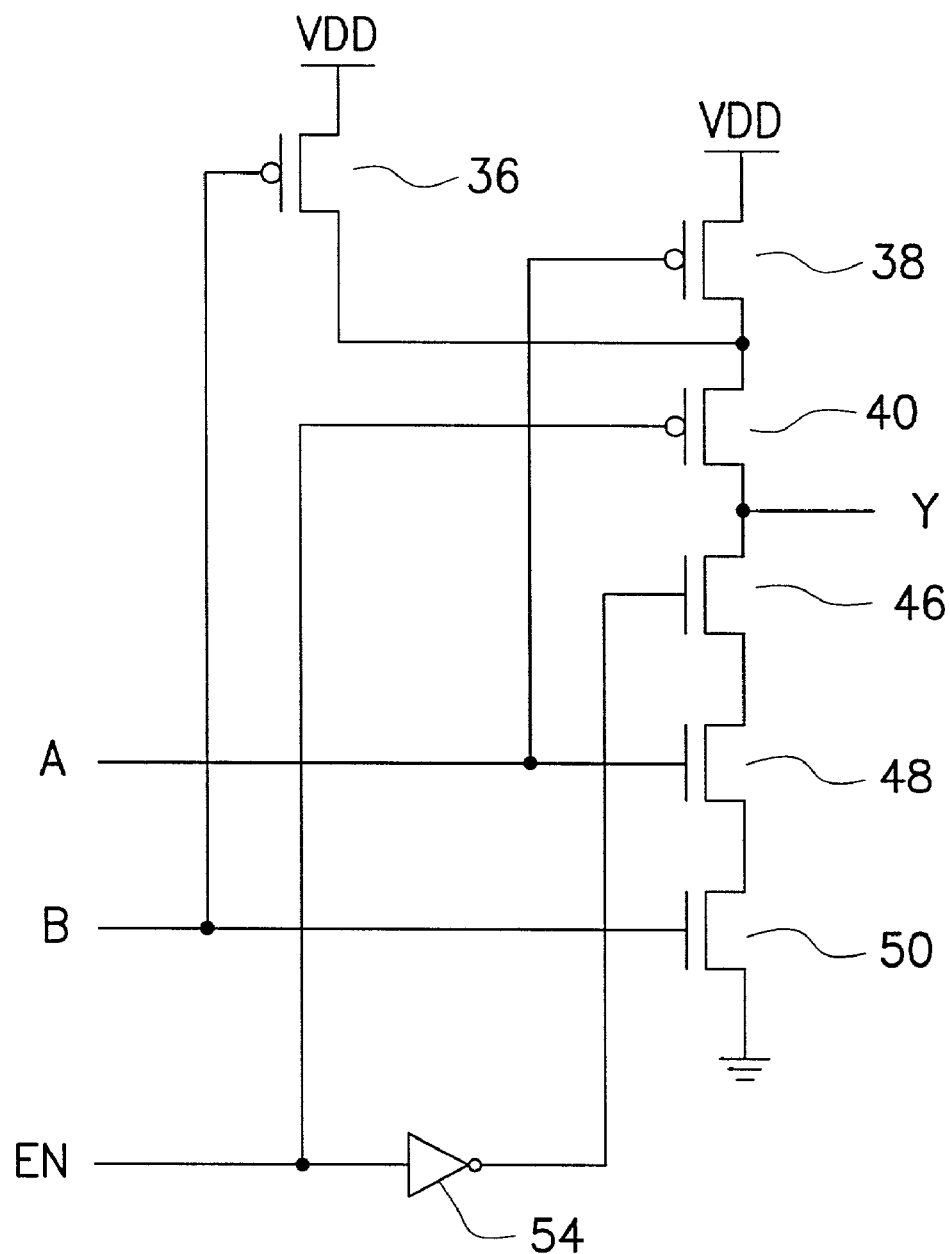
FIG. 3B is a diagram showing the internal operating unit circuit within of a chipset according to one preferred embodiment of this invention.

FIG. 3B is a diagram showing the internal operating unit circuit within of a chipset according to one preferred embodiment of this invention. The operating unit 14 is a tri-state NAND gate. The tri-state NAND gate includes P-type field effect transistors 36, 38, 40, N-type field effect transistors 46, 48, 50, and an inverter 54. An enable EN pin is used to control enable/disable of the tri-state NAND gate. The enable EN pin is connected to the P-type field effect transistor 40 and the N-type field effect transistor 46 via the inverter 54. Both the P-type field effect transistor 40 ad the N-type field effect transistor 46 are controlled by the enable EN pin. Detailed description of the enable/disable operation of the circuit is not repeated here.

Accordingly, the circuit of this invention can be applied to build the North Bridge of a chipset. In general, the operating current and voltage of a North Bridge are 90 mA~100 mA and 3.3V respectively. From the above consideration, a convention North Bridge will consume about 0.297 W~0.3 W of power whether or not any computation is executed. In other words, a North Bridge fabricated according to the design of this invention can save up to 0.3 W by shutting the operating unit when the operating unit is not operating.

Aside from saving power, the power-saving module of this invention also reduces heat generation and hence the chipset can operate in a more stable environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of operating a chipset for saving power consumption, wherein said chipset includes a plurality of basic operating units, a plurality of control units and a plurality of input/output ports, and each operating unit and input/output port is at least connected to a control unit with a tri-state circuit, the method comprising the steps of:

when said chipset no longer requires a particular operating unit, said chipset immediately activates said control unit of said operating unit to disable said operating unit by the tri-state circuit so that said operating unit switches to a power-saving mode; and when said chipset requires a particular operating unit, said chipset immediately activates said control unit of said operating unit to enable said operating unit by the tri-state circuit so that said operating unit switches to an active mode for performing computations.

2. The method of claim 1, wherein the operating unit is completely shut down to save power consumption, when said operating unit is disabled by its corresponding control unit.

3. The method of claim 1, wherein said step of having said chipset activating said control unit to enable a particular operating unit further includes said sub-steps of:

leaving said power-saving mode temporarily from said enabled operating unit;

stepping into an active mode after leaving said power-saving mode;

starting to execute necessary computations after stepping into an active mode;

leaving said active mode after finishing executing said computations; and stepping into said power-saving mode after leaving said active mode.

4. The method of claim 1, wherein said operating unit includes a tri-state inverter.

5. The method of claim 1, wherein said operating unit includes a tri-state control NAND gate.

6. A method of operating a chipset for saving power consumption, wherein said chipset includes a plurality of basic operating units, a plurality of control units and a plurality of input/output ports, and each operating unit and input/output port is at least connected to a control unit with a tri-state circuit, the method comprising the steps of:

when said chipset no longer requires an operation of a particular operating unit, wherein said chipset immediately sends a request signal to said control unit of said operating unit so that said control unit can disable said operating unit by the tri-state circuit and switch said operating unit into a power-saving mode; and when said chipset requires said operation of a particular operating unit, wherein said chipset immediately sends a request signal to said control unit of said operating unit so that said control unit can enable said operating unit by the tri-state circuit and switch said operating unit into an active mode.

7. The method of claim 6, wherein said operating unit is completely shut down to save power consumption when said operating unit is disabled by its corresponding control unit.

8. The method of claim 6, wherein said step of having said chipset activating said control unit to enable a particular operating unit further includes said sub-steps of:

leaving said power-saving mode temporarily from said enabled operating unit;

stepping into an active mode after leaving said power-saving mode;

starting to execute necessary computations after stepping into an active mode;

leaving said active mode after finishing executing said computations; and stepping into said power saving mode after leaving said active mode.

9. The method of claim 6, wherein said operating unit includes a tri-state inverter.

10. The method of claim 6, wherein said operating unit includes a tri-state control NAND gate.

* * * * *